United States Patent [19]
van der Tuijn et al.

[11] Patent Number: 6,073,009
[45] Date of Patent: *Jun. 6, 2000

[54] RADIO SIGNAL CONTROLLER RADIO COMMUNICATION DEVICE, RADIO COMMUNICATION SYSTEM AND METHODS OF CONTROLLING A RADIO

[75] Inventors: Roland van der Tuijn, Mougins, France; Michael Staplehurst, Cambridge, United Kingdom

[73] Assignee: VLSI Technology, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/808,548

[22] Filed: Feb. 28, 1997

[51] Int. Cl.[7] ...................................................... H04B 1/38
[52] U.S. Cl. ........................... 455/422; 455/561; 455/575
[58] Field of Search ............................. 455/422, 69, 462, 455/465, 522, 561, 571, 572, 575

[56] References Cited

U.S. PATENT DOCUMENTS

| | | | |
|---|---|---|---|
| 4,346,441 | 8/1982 | Plank et al. | 364/200 |
| 4,456,793 | 6/1984 | Baker et al. | 455/417 |
| 4,682,168 | 7/1987 | Chang et al. | 340/825.65 |
| 5,175,875 | 12/1992 | Yokoya et al. | 455/571 |
| 5,201,068 | 4/1993 | Kawashima | 455/571 |
| 5,212,684 | 5/1993 | MacNamee et al. | 370/24 |
| 5,412,650 | 5/1995 | Davies | 370/82 |
| 5,416,778 | 5/1995 | Chan et al. | 370/95.1 |
| 5,418,838 | 5/1995 | Havermans et al. | 379/60 |
| 5,459,873 | 10/1995 | Moore et al. | 455/277 |
| 5,471,671 | 11/1995 | Wang et al. | 455/62 |
| 5,473,668 | 12/1995 | Nakahara | 455/465 |
| 5,511,110 | 4/1996 | Drucker | 455/458 |
| 5,515,420 | 5/1996 | Urasaka et al. | 455/462 |
| 5,544,226 | 8/1996 | Weis et al. | 379/61 |
| 5,559,961 | 9/1996 | Okamura et al. | 395/200.06 |

OTHER PUBLICATIONS

Product Brochure: "Digital Enhanced Cordless Telecommunications (DECT)," XSYS New Media Technologies Group, May, 1996; pp. 1–33.

ETSI Publication: "Radio Equipment and Systems (RES); Digital European Cordless Telecommunications (DECT) Common interface Part 1: Overview," European Telecommunications Standards Institute, Oct., 1992; pp. 1–30.

ETSI Publication: "Radio Equipment and Systems (RES); Digital European Cordless Telecommunications (DECT) Common interface Part 2: Physical layer," European Telecommunications Standards Institute, Oct., 1992; pp. 1–39.

DECT Publication: "VP23001 Radio Interface Application Note," Ver. 1. 10, Feb., 1996, pp. 1–30.

*Primary Examiner*—Daniel S. Hunter
*Assistant Examiner*—Thuan T. Nguyen
*Attorney, Agent, or Firm*—Wells, St.John, Roberts, Gregory & Matkin, PS

[57] ABSTRACT

The present invention provides a radio signal controller comprising: a memory device having a plurality of memory locations individually configured to store at least one radio signal level value; a memory controller operable to sequentially address the memory locations; and a signal generator operable to receive at least one radio signal level value and output a radio control signal responsive thereto. The present invention additionally provides for a radio communication device, radio communication system and method of controlling a radio.

63 Claims, 13 Drawing Sheets

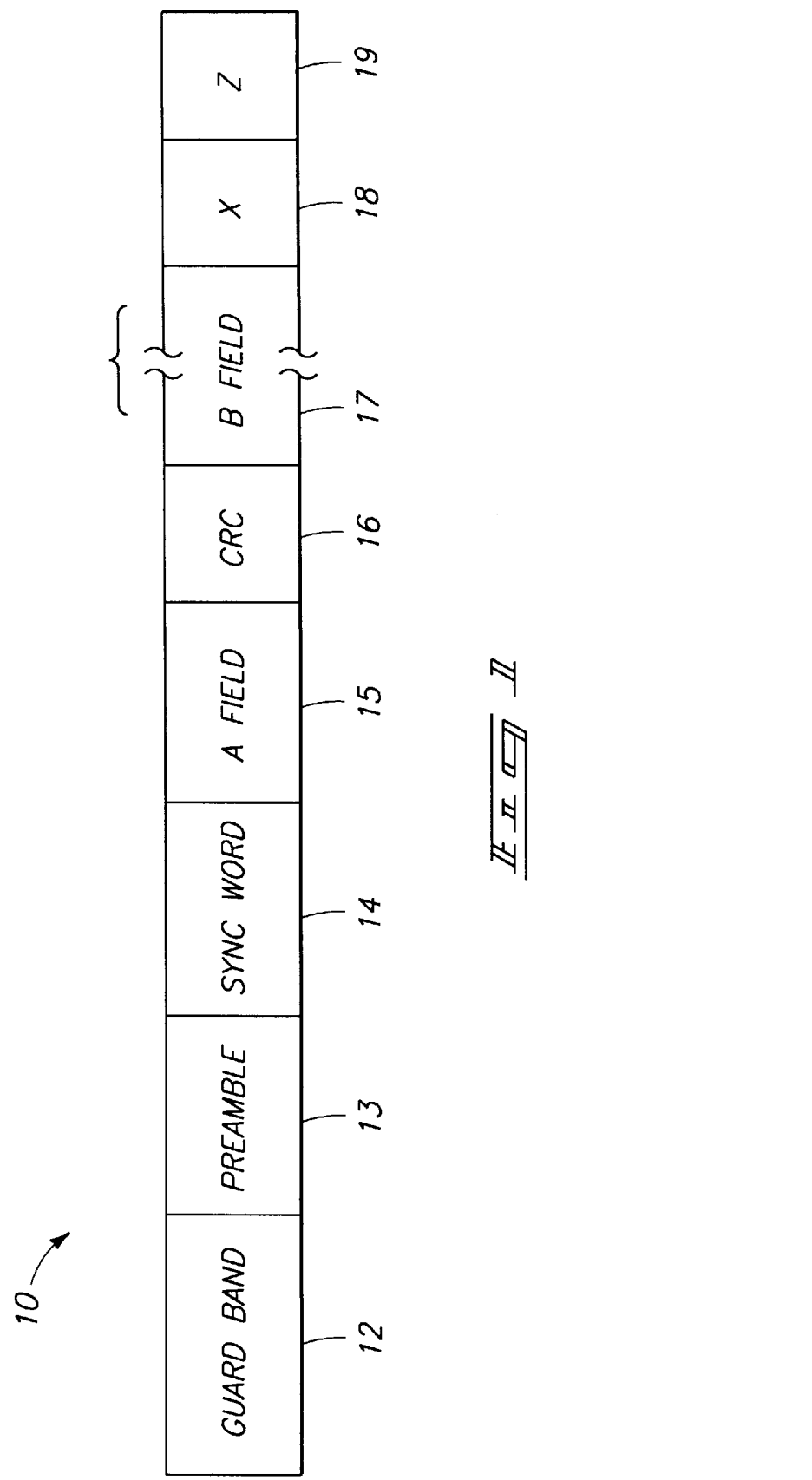

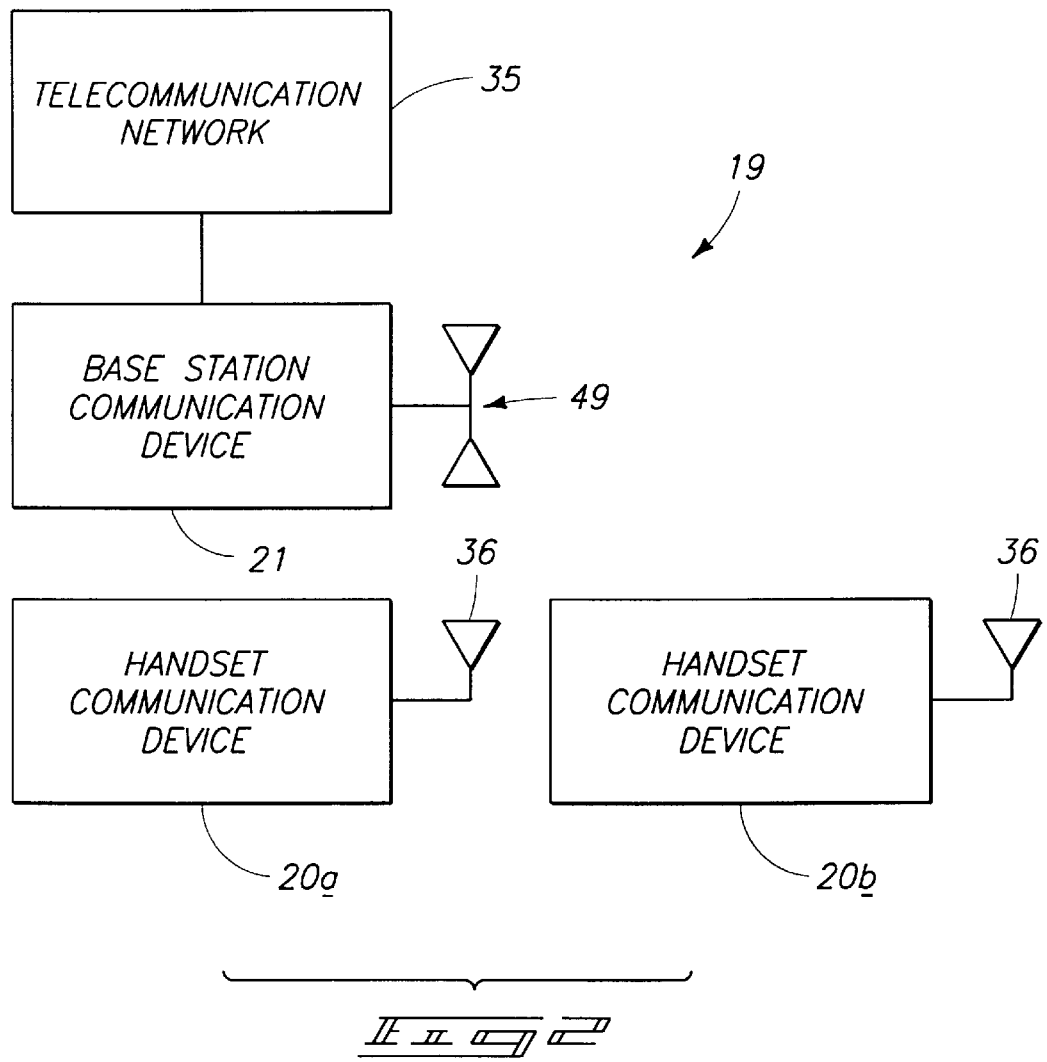

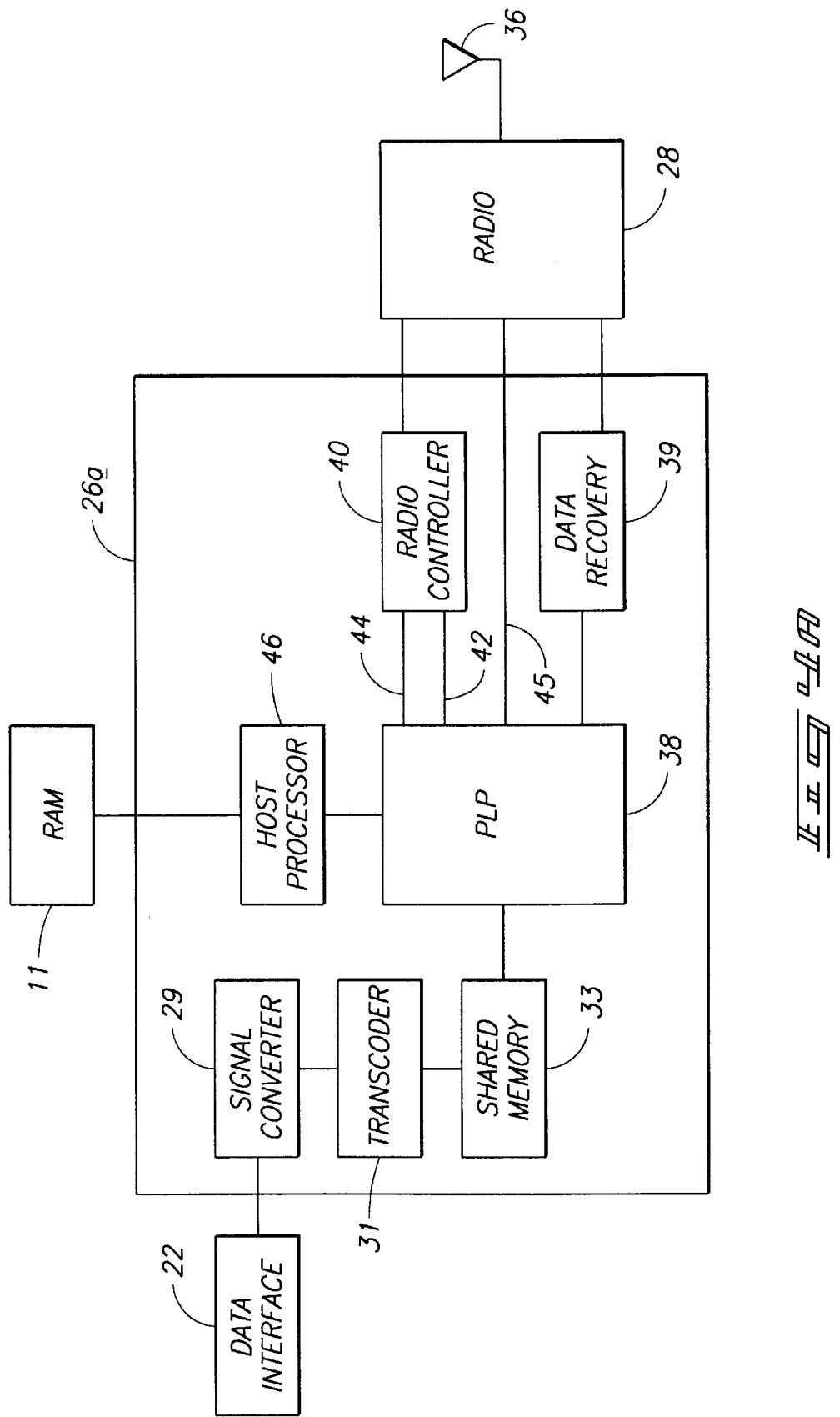

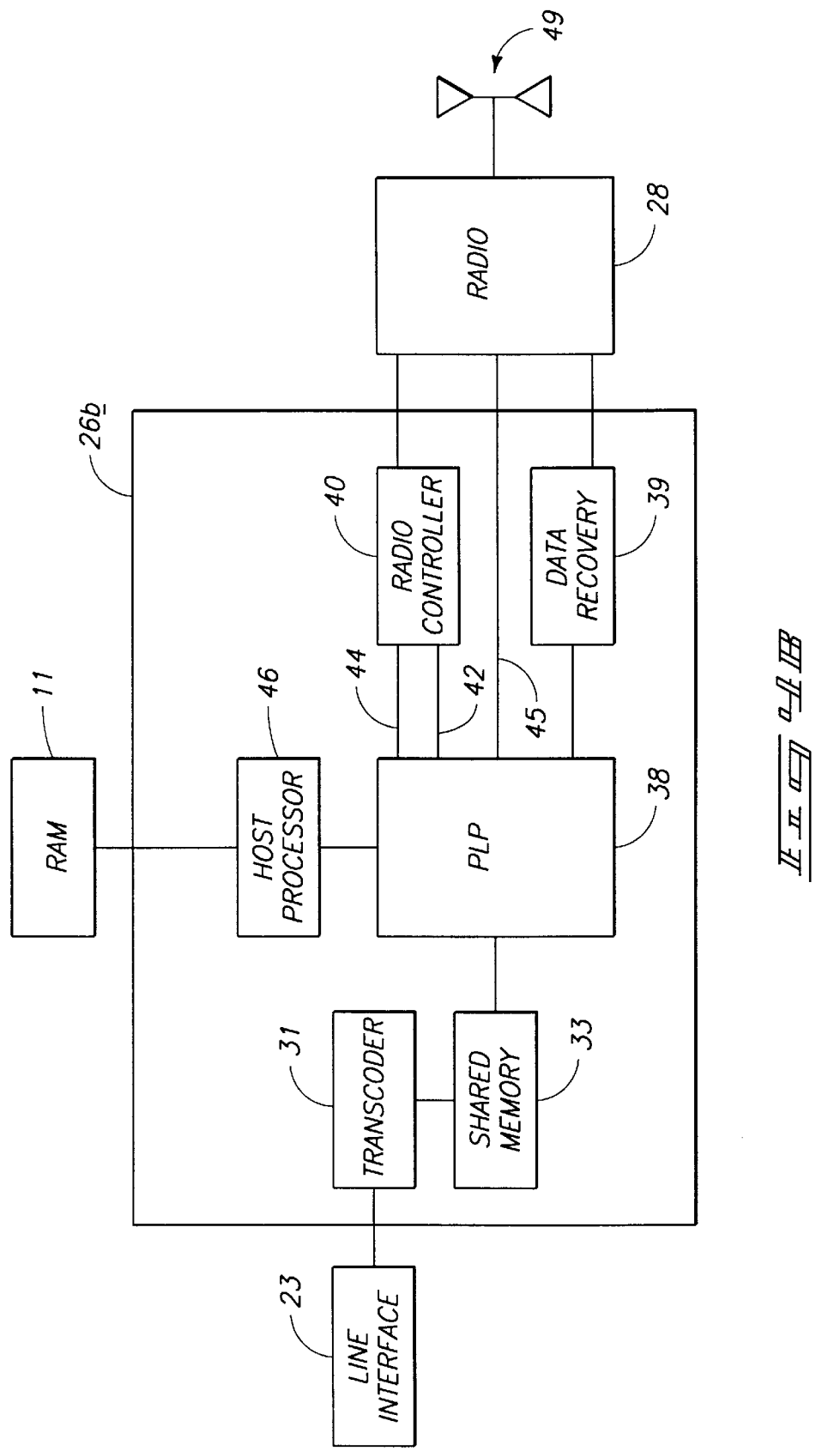

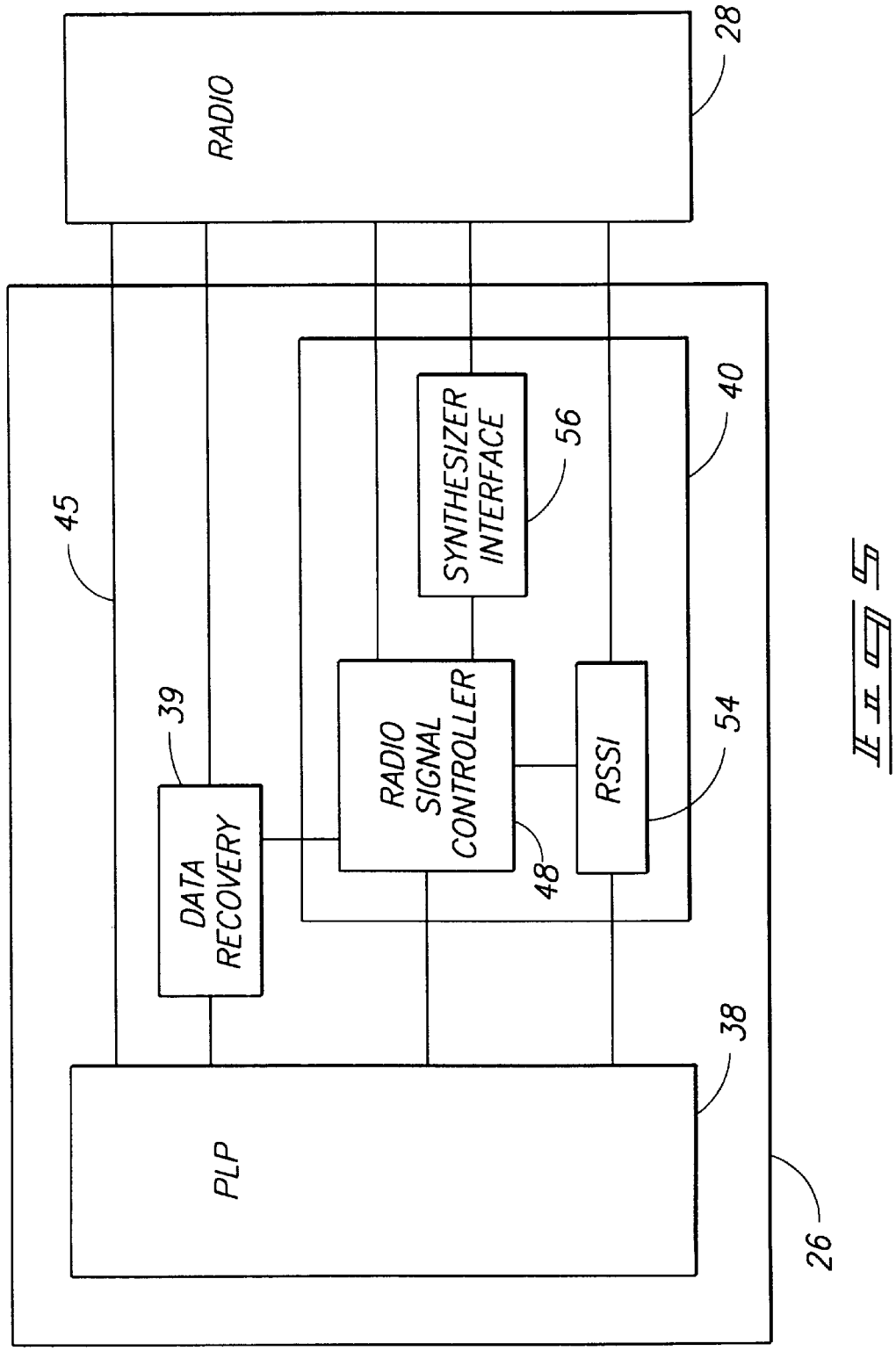

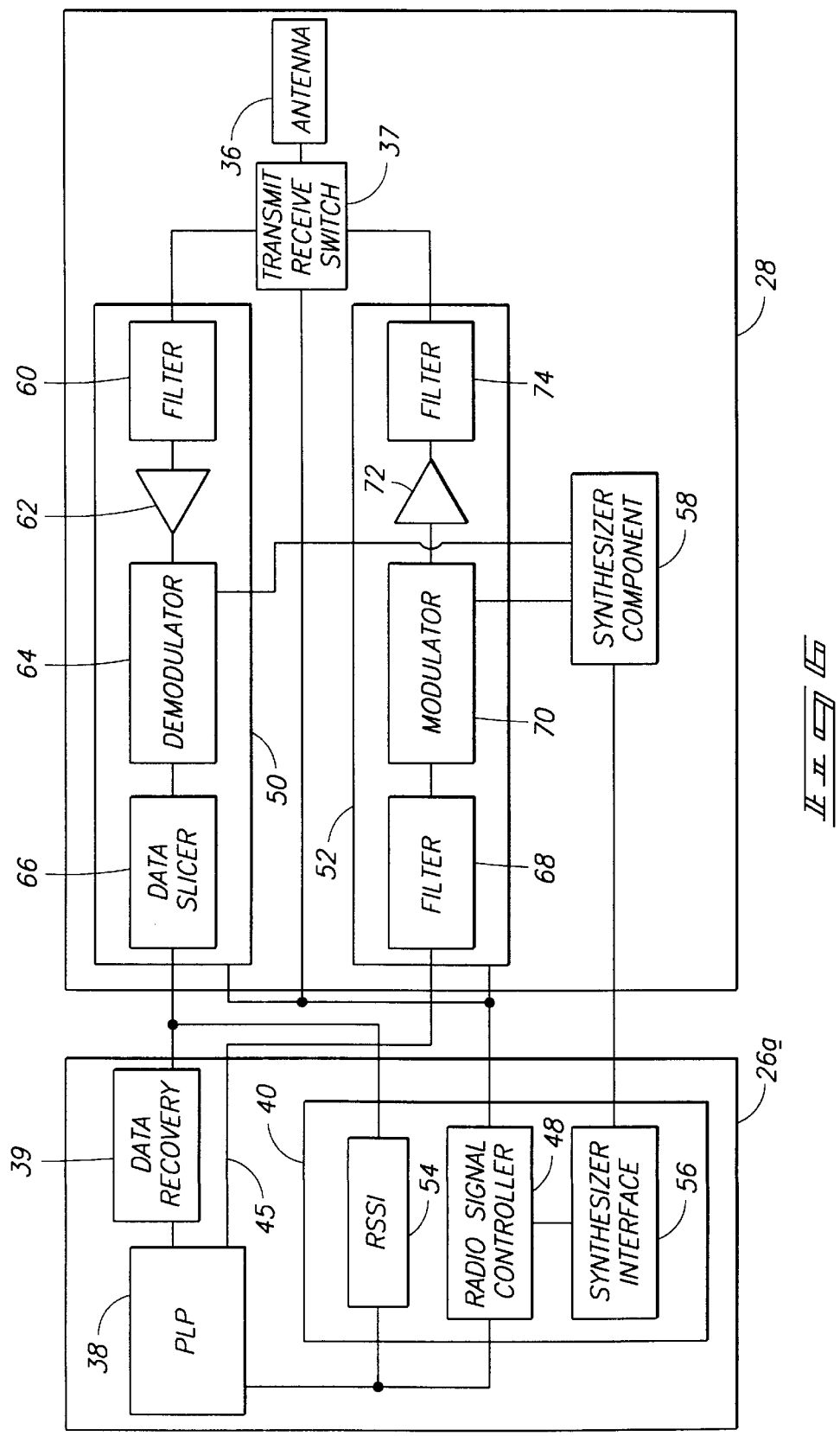

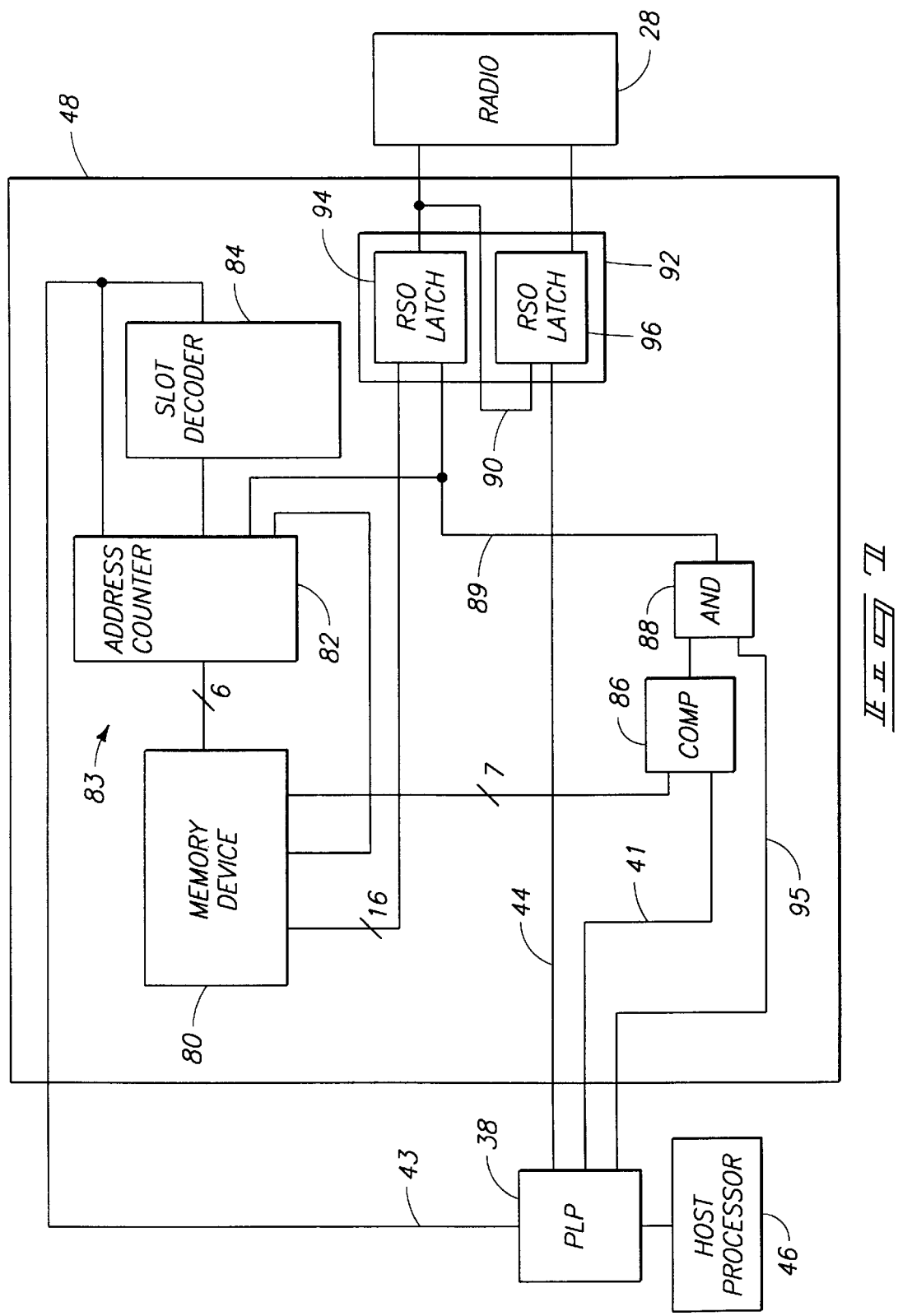

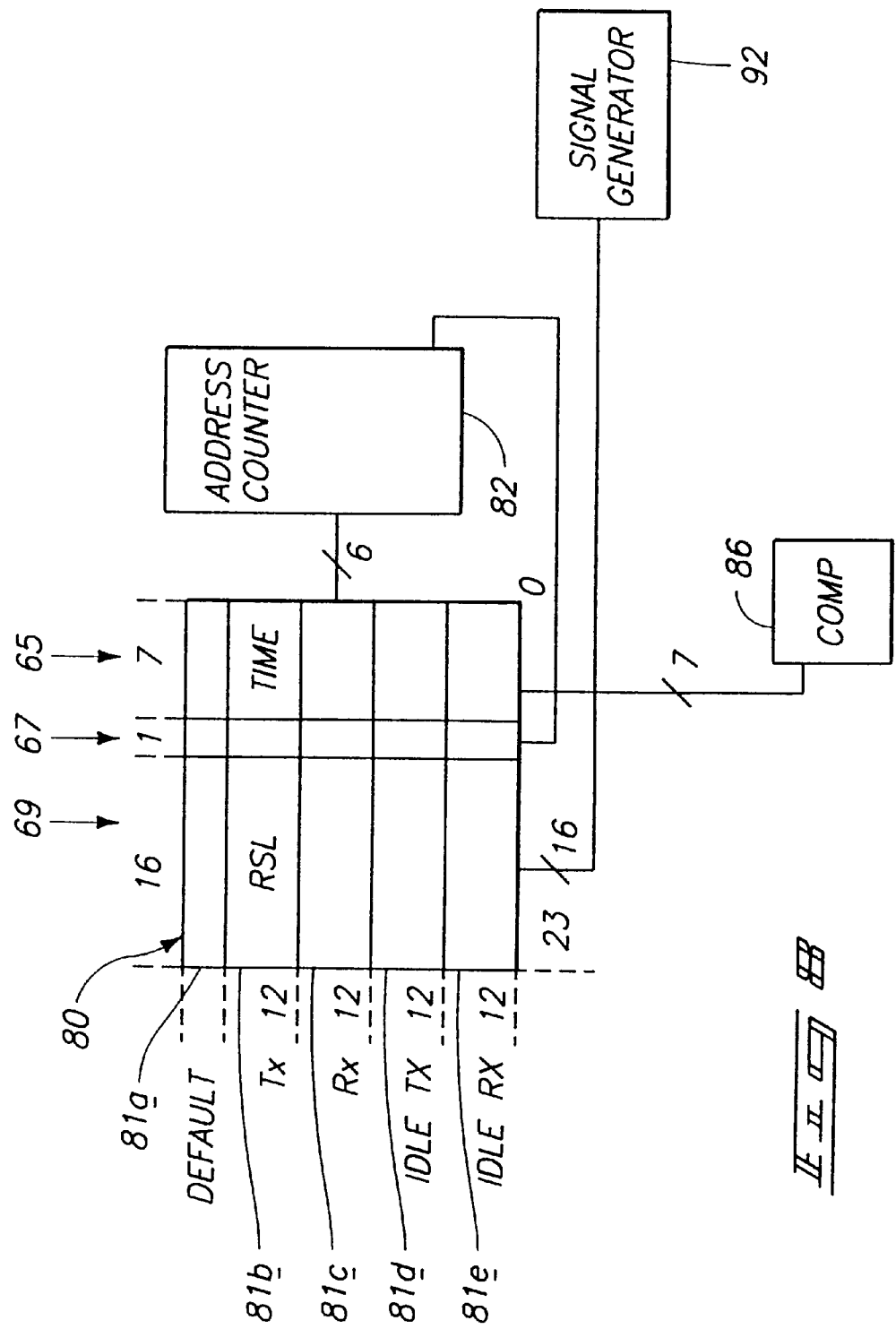

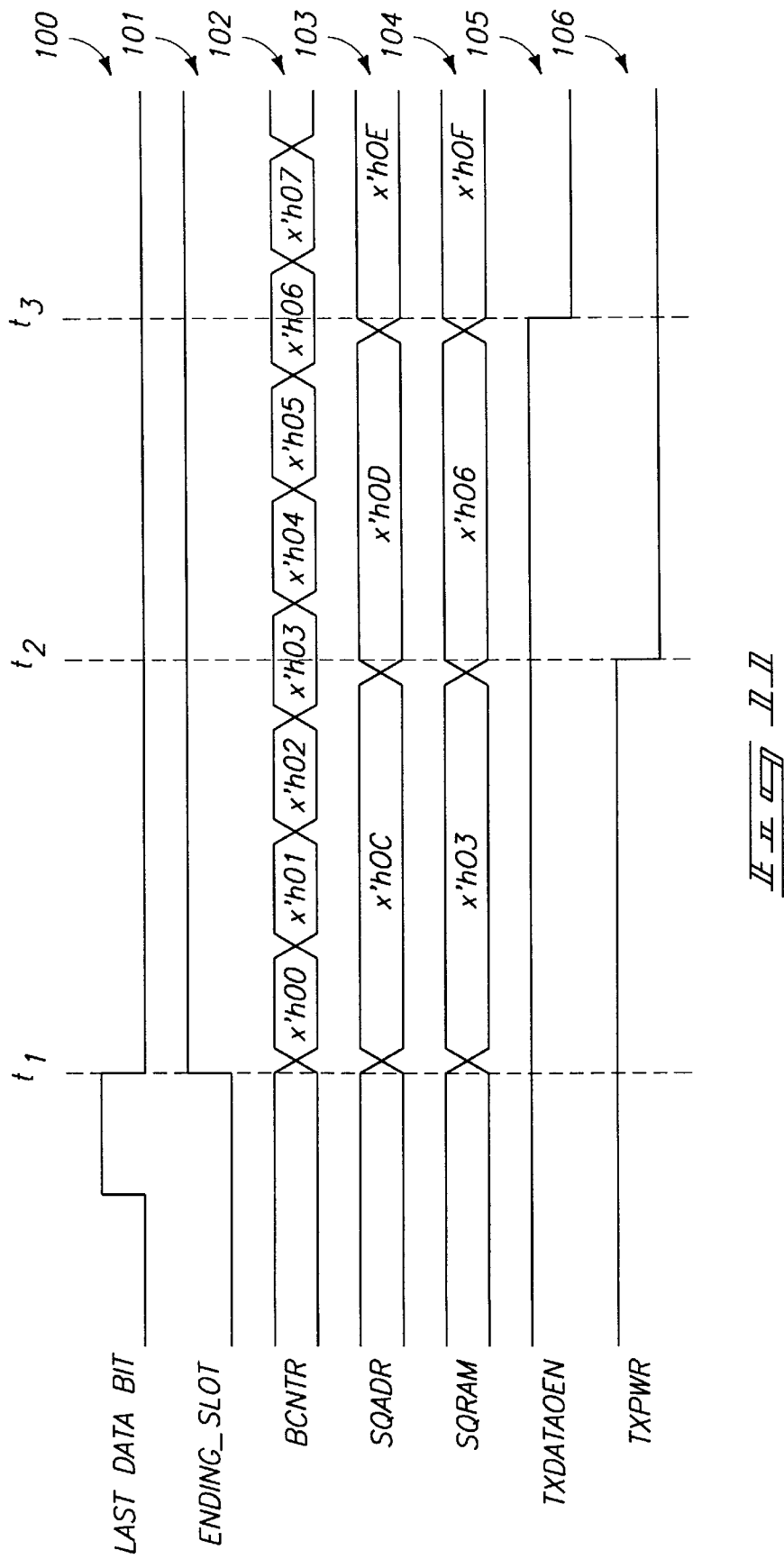

RADIO SIGNAL CONTROLLER RADIO COMMUNICATION DEVICE, RADIO COMMUNICATION SYSTEM AND METHODS OF CONTROLLING A RADIO

TECHNICAL FIELD

The present invention relates to radio signal controllers, radio communication devices, radio communication systems and methods of controlling a radio.

BACKGROUND OF THE INVENTION

Generally speaking, a cordless telephone includes a handset coupled via radio connection with a base station. The base station is usually connected by wire to a traditional Public Switched Telephone Network (PSTN) or an Integrated Services Digital Network (ISDN). The development of new cordless standards which are based upon digital technology provide a broad spectrum of applications. Exemplary cordless applications include wireless Private Automatic Branch Exchange (PABX), wireless Local Area Network (LAN), Telepoint, and Radio Local Loop. Cordless standards include Digital Enhanced Cordless Telecommunications (DECT), GSM, PHS, AMPS, IS54 or IS95. The digital cordless telephones represent a valid alternative to cellular phones in densely populated areas.

DECT is a cordless standard defined as a Multicarrier (MC), Time Division Multiple Access (TDMA)/Time Duplex Division (TDD) system. Time is divided in the DECT standard into frames of 10 ms. Each frame is divided into 24 full slots. The standard also allows for half slots and double slots of data.

In order to be able to support multiple channels, a DECT base station compresses and transmits 10 ms of speech during one full slot. This means that 10 ms of speech are actually sent over the radio in 416 $\mu$s. Every active connection makes use of two slots, one for receiving and one for transmitting. For example, if the slots in a DECT frame are numbered from 0 to 23, the first 12 slots (0–11) are used for transmission from the base station to the handset and the remaining slots are used for handset to base station transmission. A base station transmitting to a given handset in slot N will always receive from this handset in slot N plus 12, or in other words, half a frame later. Accordingly, a DECT base station is able to support up to 12 active voice connections at the same time.

The total number of bits within a conventional DECT slot is 480. With 24 slots and a 10 ms frame, a gross bit rate of 1.152 Mbits/s is provided. Once the DECT slot has been formatted, it is transmitted using one of 10 radio frequencies specified within the DECT standard. For example, the frequency band assigned to DECT in Europe is between 1,880 and 1,900 Mhz, with a spacing of 1.728 Khz between adjacent frequencies. The transmission frequency for each channel is chosen dynamically based upon a Radio Signal Strength Indication (RSSI). Each active slot in the DECT frame may be transmitted and received on any of the 10 frequencies.

SUMMARY OF THE INVENTION

The present invention provides radio signal controllers, radio communication devices, radio communication systems and methods of controlling a radio. According to one aspect, the present invention provides a radio signal controller comprising: a memory device having a plurality of memory locations individually configured to store at least one radio signal level value; a memory controller operable to sequentially address the memory locations; and a signal generator operable to receive at least one radio signal level value and output a radio control signal responsive thereto. The present invention includes additional aspects as disclosed herein.

BRIEF DESCRIPTION OF THE DRAWINGS

Preferred embodiments of the invention are described below with reference to the following accompanying drawings.

FIG. 1 is a diagrammatic representation of a DECT slot.

FIG. 2 is a functional block diagram of a radio communication system.

FIG. 4a is a functional block diagram of an embodiment of a burst mode controller within the handset radio communication device.

FIG. 4b is a functional block diagram of an embodiment of a burst mode controller within the base station radio communication device.

FIG. 5 is a functional block diagram of a burst mode controller and radio controller therein.

FIG. 6 is a functional block diagram of the burst mode controller of the handset radio communication device coupled with a radio.

FIG. 7 is a functional block diagram of an embodiment of a radio signal controller within the radio controller.

FIG. 8 is a diagrammatic representation of an embodiment of a memory device within the radio signal controller.

FIG. 11 is an idle transmit sequence signal diagram.

DETAILED DESCRIPTION OF THE PREFERRED EMBODIMENTS

Figure 3A:
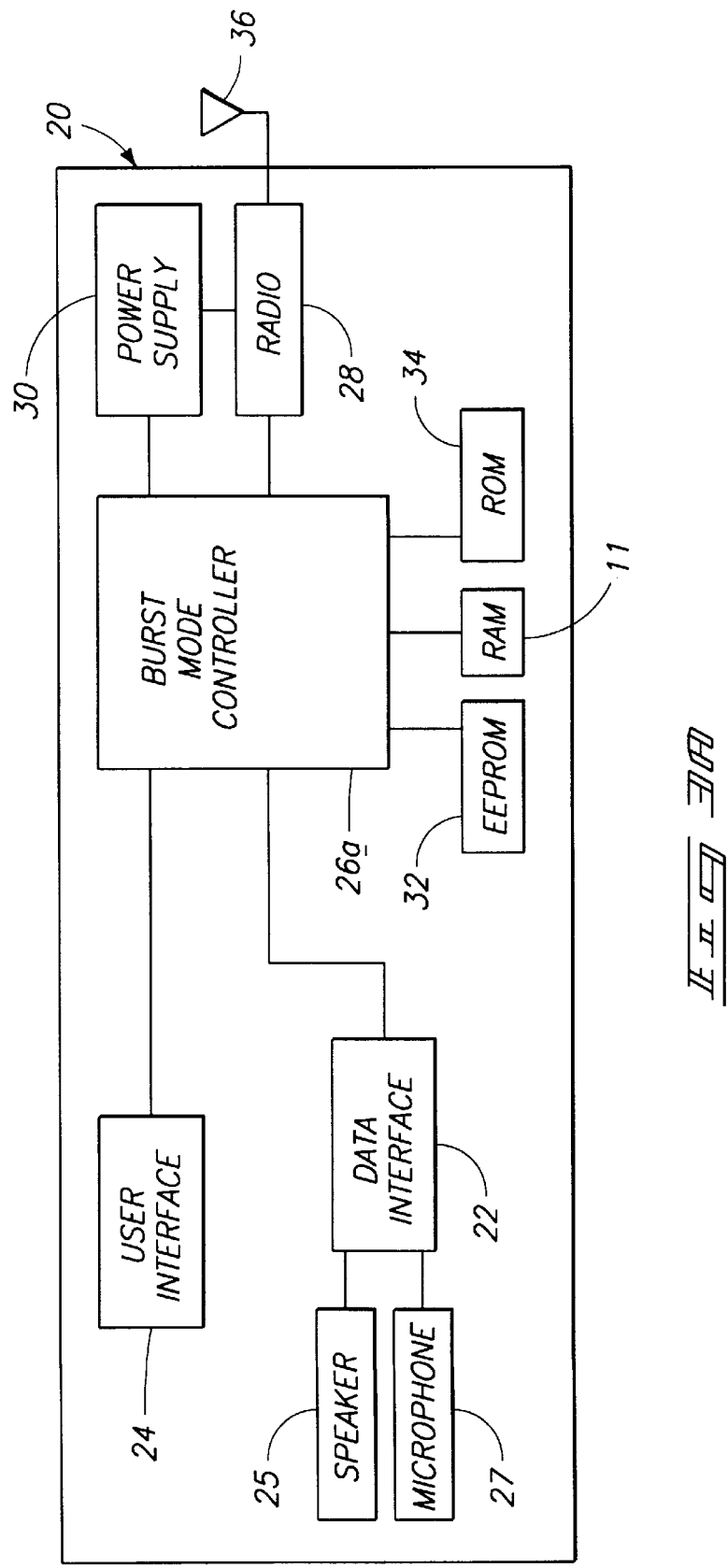
FIG. 3a is a functional block diagram of an embodiment of a portable handset radio communication device.

This disclosure of the invention is submitted in furtherance of the constitutional purposes of the U.S. Patent Laws "to promote the progress of science and useful arts" (Article 1, Section 8).

In accordance with a first aspect of the present invention, a radio signal controller comprises: a memory device having a plurality of memory locations individually configured to store at least one radio signal level value; a memory controller operable to sequentially address the memory locations; and a signal generator operable to receive at is least one radio signal level value and output a radio control signal responsive thereto.

In accordance with a second aspect of the present invention, a radio signal controller comprises: an input line operable to receive a timing signal; a memory device configured to store at least one radio signal level value; a memory controller operable to address the memory device responsive to the timing signal; and a signal generator operable to receive the at least one radio signal level value and output a radio control signal responsive thereto.

In accordance with another aspect of the present invention, a radio signal controller comprises: an input line operable to receive a timing signal; a memory controller operable to generate at least one address control signal responsive to the timing signal; and a memory device configured to store at least one radio signal level value and output the at least one radio signal level value responsive to the at least one address control signal.

In yet another aspect of the present invention, a radio communication device includes a data processor operable to process a data signal and generate a timing signal, a radio operable to at least one of transmit and receive the data signal, and a radio signal controller operable to control selected operations of the radio, and the radio signal controller comprises: a memory device configured to store at least one radio signal level value; a memory controller configured to address the memory device responsive to the timing signal; and a signal generator configured to receive at least one radio signal level value and output a radio control signal responsive thereto.

In still another aspect of the present invention, a radio communication system includes a plurality of communication devices individually operable to at least one of transmit and receive a data signal, and the communication devices individually comprise: a data processor operable to process the data signal and generate a timing signal; a radio configured to at least one of transmit and receive radio frequency signals; and a radio signal controller including a memory controller operable to generate sequential address control signals responsive to the timing signal, a memory device having a plurality of memory locations individually configured to store at least one radio signal level value and being configured to output at least one radio signal level value responsive to the address control signals.

Another aspect of the present invention provides a method of controlling a radio, comprising: providing a memory device; storing a radio signal level value within the memory device; generating a timing signal; reading the radio signal level value responsive to the timing signal; and applying a radio control signal to the radio responsive to reading the radio signal level value.

While the present invention is described herein with reference to the DECT standard, it is to be understood that the present invention is not limited thereto. The present invention is also applicable to cordless communication systems which utilize other communication protocols or standards.

An exemplary DECT slot 10 is shown in FIG. 1. The DECT slot 10 includes a plurality of predefined fields. A guard band 12 consisting of 56 bits is provided for frequency switching and delay handling between adjacent slots when, due to the distance between a handset and base station, received slots are delayed with regard to the DECT frame timing. Last bits of the slot could interfere with the first bits of the following slot if no guard band 12 is provided.

The first transmitted bits belong to the Synchronization Field which includes a preamble 13 of 16 bits and a synchronization word 14 of 16 bits. These bits are the same in each slot and each frame and are used on the receive side by the handset to synchronize to the base station timing. Additionally, the preamble 13 and sync word 14 are used by the base station to detect the beginning of the handset transmission. The handset and base station have different preambles 13 and sync words 14.

An A Field 15 of 64 bits is transmitted after the sync word 14. The A Field 15 contains the DECT protocol messages exchanged between the handset and base station as well as information on the content of a B Field 17 which follows thereafter. A first cyclic redundancy check field 16 of 16 bits is provided intermediate the A field 15 and B field 17. The B Field 17 is typically 320 bits which corresponds to 80 4-bit ADPCM (Adaptive Differential Pulse Code Modulation) samples and contains the real voice data (10 ms of speech). The DECT slot 10 also contains an X Field 18 of 4 bits and a Z Field 19 of 4 bits.

Referring to FIG. 2, an embodiment of a DECT communication system 19 is shown. The DECT communication system 19 generally comprises a plurality of communication devices 20, 21. More specifically, the communication system 19 preferably includes a plurality of portable handset communication devices 20a, 20b and at least one fixed base station communication device 21. Fixed base station communication device 21 may be coupled with a telecommunications network 35 (e.g., ISDN or PSTN).

Figure 3B:
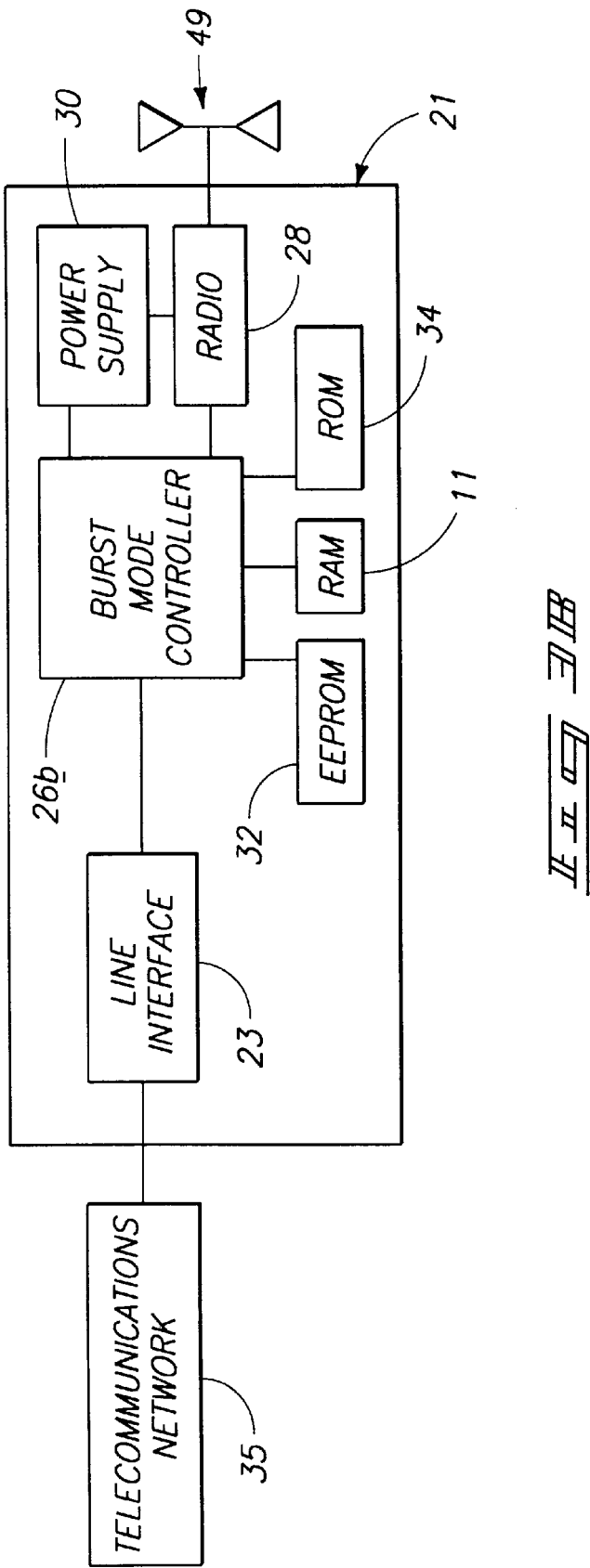
FIG. 3b is a functional block diagram of an embodiment of a fixed base station radio communication device.

Referring to FIGS. 3a, 3b, the portable handset radio communication device 20 and fixed base station radio communication device 21 include a number of common components. The communication devices 20, 21 individually include a respective burst mode controller (BMC) 26a, 26b, radio 28, power supply 30, RAM 11, EEPROM 32, and ROM 34.

The base station communication device 21 additionally includes a line interface 23 which is operable to provide a data connection with ii the telecommunications network 35. Although not required, a user interface may be provided within the base station 21 to provide base station status information. The data signal received via the telecommunications network 35 is applied to the burst mode controller 26b which performs data manipulation operations described in detail below, and the radio 28. A data signal received via the radio 28 is applied to the burst mode controller 26b and telecommunications network 35.

The portable handset communication device 20 includes additional components including a data interface 22, user interface 24, speaker 25 and microphone 27. The data interface 22 of the portable handset 20 provides connections to the microphone 25 and speaker 27 which respectively operate to convert audible sounds into electrical signals and vice versa. The electric signals produced within the microphone 25 are applied to the data interface 22, burst mode controller 26a and radio 28. A data signal received via the radio 28 is applied to the burst mode controller 26a and speaker 25 for conversion to audio signals.

The user interface 24 preferably includes a keypad which is operable to receive user input instructions for controlling operations of the handset 20. The user interface 24 may additionally comprise a display, such as a liquid crystal display (LCD), enabling the user to monitor handset 20 operation.

A burst mode controller 26a, 26b is provided intermediate the so data interface 22 (or line interface 23) and radio 28 within each respective communication device 20, 21. The burst mode controllers 26a, 26b contain the base-band architecture of the respective communication devices 20, 21. Each burst mode controller 26a, 26b is operable to access the data signal at appropriate times within the TDMA frame from the data interface 22 or line interface 23, respectively. The burst mode controllers 26a, 26b output the data in transmit slots in compliance with the DECT standard. The transmit slots are applied to the radio 28 and transmitted via radio frequency signal. The burst mode controllers 26a, 26b are additionally operable to transform a plurality of DECT slots received from the respective radios 28, and apply a corresponding output digital data stream to the respective data interface 22 or line interface 23.

Referring to FIGS. 4a, 4b, preferred embodiments of the burst mode controllers 26a, 26b are shown. Each burst mode controller 26a, 26b may include a respective transcoder 31, shared memory 33, data processor such as a physical layer processor (PLP) 38, host processor 46, radio controller 40 and data recovery circuit 39. The functions of these components is discussed in detail below.

The first burst mode controller 26a additionally includes a signal converter 29. The signal converter 29 is operable to provide analog to digital conversion operations within the handset communication device 20. The signal converter 29 is configured to sample the voice or other analog data signal at 8 Khz to provide sufficient voice quality in accordance with the Nyquist rate. The sampled signal may be converted into a 64 kbit/s digital signal in two steps. First, the analog signal is converted into a 14 bit linear Pulse Code Modulated (PCM) signal. Second, the linear PCM signal is compounded into an 8 bit signal wherein the sample is quantizied using a logarithmic scale thereby minimizing the quantizing error at small amplitudes. A preferred signal converter 29 implements the standards described in the International Telegraph and Telephone Consultative Committee (CCITT) Blue Book G711 recommendation.

Inasmuch as frequency bands assigned to the cordless systems are generally relatively narrow, the bit stream rate must be minimized in order to achieve desired traffic density figures. Therefore, the transcoder 31 is provided within both communication devices 20, 21. The transcoder 31 is preferably an Adaptive Differential PCM transcoder. During the encoding phase, the transcoder 31 compares the 8 Khz signal provided by the signal converter 29 with an estimate of the same signal calculated by the transcoder 31 from previously received samples. A 4 bit coded word having the same frequency as the input contains the difference between the input signal and the estimated signal. The data rate of the ADPCM samples is 32 kbit/s. A preferred transcoder 31 is specified by the International Telegraph and Telephone Consultative Committee (CCITT) Blue Book G726 recommendation.

Referring to FIGS. 4a and 4b, following processing within the respective transcoder 31, the input transmit data signal is stored within the shared memory 33. The manipulation of the transmit data signal following the storage thereof within the shared memory 33 is the same within both communication devices 20, 21 and is discussed hereafter with reference to FIGS. 4a, 4b.

The physical layer processor (PLP) 38 is configured to provide data manipulation of both the transmit data signal and receive data signal. An embodiment of a physical layer processor 38 is disclosed in an U.S. patent application, having Ser. No. 08/661,606, entitled "Asynchoronouse Timing Genorator in DECT Base Band Products", filed Jun. 11, 1996, naming Michel Eftimakis and Gianmaria Mazzucchelli as inventors, assigned to the assignee hereof, having assignee reference number 2602, and incorporated herein by reference.

In particular, the physical layer processor 38 provides data frame construction of the transmit data signals for utilization within the DECT protocol. The physical layer processor 38 retrieves the data signal to be transmitted from the shared memory 33 and transforms the transmit data signal into a plurality of DECT slots. The physical layer processor 38 interfaces via radio controller 40 with the radio 28 and is operable to apply the transmit DECT slots via line 45 to the radio 28 for transmission by radio frequency signal.

The host processor 46 is configured to execute software which implements the DECT protocol. The host processor 46 has access to EEPROM 32 and ROM 34 and RAM 11 (shown in FIGS. 3a, 3b). The EEPROM 32 is operable to store codes and information for encryption. The ROM 34 stores at least one radio control code utilized by the host processor 46 to initialize the radio controller 40 and implement the DECT protocol. Host processor 46 downloads time field, signal level field, and end field data from ROM 34 to a memory device 80. Host processor 46 has access to RAM 11 which may be utilized for variable storage during execution of code.

The radio control code is programmed to provide optimum performance of the particular radio 28 utilized within the communication device 20, 21. The communication device 20, 21 according to the present invention may be utilized with a variety of radios. The radio control code stored within the ROM 34 is written for use with the specific radio 28 being utilized. In particular, the timing of the assertion and de-assertion (also referred to herein as activation and de-activation) of various radio control signals is determined by the ROM radio control code in accordance with specifications of the particular radio 28 implemented within the communication device 20, 21.

Alternately, the communication device 20, 21 could include a memory device having sufficient capacity to store numerous codes enabling use with one of a plurality of different radios. However, it is preferred to provide one radio control code within the ROM 34 to minimize the memory capacity requirements thereof. Normally, the radio controller 40 interfaces with one type of radio in a given application.

In a receive mode of operation, the radio 28 within the appropriate communication device 20, 21 receives the transmitted radio frequency signal and performs demodulation operations to recover the base band data stream. The receive data stream, in the form DECT slots, is applied to the data recovery 39 and burst mode controller 26 wherein the data is extracted from the DECT slots. The burst mode controller 26 stores ADPCM 4-bit samples within the shared memory 33. The transcoder 31 retrieves the data samples from the shared memory 33 and converts the samples into the 8 Khz data signal.

The receive data signal may be applied to the line interface 23 within a base station communication device 21 for transmission to the telecommunications network (ISDN or PSTN) 35. Alternatively, the receive data signal is applied to the signal converter 29 of the handset communications device 20 which converts the digital data signal into an analog output signal. The analog output signal is applied to the data interface 22 and speaker 25.

The radio 28 and interfacing with the burst mode controller 26 are discussed in detail below. The radio 28 within each communication device 20a, 20b includes a respective antenna 36, 49 which is operable to receive and transmit radio frequency signals. Spatial antenna diversity 49 may be provided at the base station 20b to improve the reception of the radio frequency signals. One of two antennas within the antenna diversity 49 is selected to provide the best signal for each time slot. Providing antenna diversity 49 is preferred in order to reduce fading and interference.

The preferred embodiment of each burst mode controller 26a, 26b provides the data recovery circuit 39 intermediate the radio 28 and physical layer processor 38. The data recovery circuit 39 is utilized to extract the receive clock from the received data signal for achieving receive clock synchronization. Preferred data recovery circuits 39 are disclosed in U.S. Pat. No. 5,598,446, issued Jan. 28, 1997, entitled "Clock Extraction On Received Data", filed Oct. 13, 1995, naming Roland van der Tuijn as inventor, assigned to the assignee hereof, having assignee reference number 2472, and incorporated herein by reference; and U.S. patent application, having Ser. No. 08/542,870,entitled "Clock Phase Correcting Filtering", filed Oct. 13, 1995, naming Roland van der Tuijn as inventor, assigned to the assignee hereof, having assignee reference number 2474 and incorporated herein by reference.

The radio controller 40 of each burst mode controller 26a, 26b controls the operation of the radio 28 in accordance with the radio control code stored within the ROM 34. The radio controller 40 operates on DECT bit timing where, at certain DECT bit times, radio control signals are asserted or de-asserted. The physical layer processor 38 includes a reference timer which generates a timing signal, referred to as a bit number (BNO). The bit number is applied to the radio signal controller 48 via line 42. The bit number corresponds to the DECT bit timing. The radio controller 40 is operable to output internally generated radio signal level values to the radio 28. In addition, the radio controller 40 is preferably configured to clock external control values generated by the host processor 46 into the radio 28.

In particular, the host processor 46 and physical layer processor 38 apply control values within a radio control word to the radio controller 40 via bus 44. The radio controller 40 thereafter selectively applies the control values in the form of corresponding radio control signals to the radio 28 responsive to the bit number. The activation or deactivation of radio control signals responsive to the bit number is discussed in detail below with reference to FIG. 7.

Referring to FIG. 5 and FIG. 6, additional details of the radio controller 40 and radio 28 are shown. The radio controller 40 interfaces with the physical layer processor 38, host processor 46 (not shown) and components of the radio 28. In general, the radio 28 includes a receiver 50, transmitter 52, and synthesizer component 58 which preferably includes a plurality of synthesizers.

During a transmit slot, the physical layer processor 38 is operable to directly transmit data, in accordance with the DECT frame structure, to the transmitter 52 via line 45. During a receive slot, the receiver 50 outputs a receive slot to the data recovery circuit 39 within the burst mode controller 26. Data recovery circuit 39 extracts the clock enabling synchronization. The receive slot and extracted clock are subsequently applied to the physical layer processor 38.

The preferred radio controller 40 includes a radio signal controller 48 which is coupled with the physical layer processor 38 and host processor 46. The radio signal controller 48 receives control information (i.e. radio control word) and timing information (e.g., bit number) generated within the host processor 46 and physical layer processor 38, respectively. The radio control word includes slot identification data and the control values.

The radio signal controller 48 contains an internal memory device which stores a plurality of radio signal level values. Responsive to the control information and DECT timing information, the radio signal controller 48 is operable to access the radio signal level values, clock in control values and generate a plurality of radio control signals corresponding thereto. The radio signal controller 48 outputs the radio control signals to the radio 28. Further details of the radio signal controller 48 are described in detail below with reference to FIG. 7.

Referring again to FIG. 6, the preferred embodiment of the radio controller 40 additionally includes Radio Signal Strength Indication (RSSI) circuitry 54 a nd a synthesizer interface 56. The RSSI circuitry 54 i s operable to generate a RSSI signal which is applied to the physical layer processor 38 and host processor 46. The transmission frequency of the radio 28 for each channel is chosen dynamically based upon the RSSI signal. The RSSI signal provides an indication of the quality of the link at the receiver 50.

The RSSI circuitry 54 includes an RSSI analog to digital converter (RSSI ADC) providing measurements related to the DECT bit stream. The measurements are taken over a predetermined number of bits within a predetermined portion of the DECT bit stream. The enabling of the RSSI circuitry 54 to provide the measurement is controlled by the radio signal controller 48 and host processor 46. The timing of the measurement within a DECT slot is additionally determined by the radio signal controller 48 and host processor 46. The RSSI signal may be utilized for controlling antenna diversity 49.

Referring to FIG. 6, the synthesizer interface 56 is coupled via a plurality of control lines to the synthesizer component 58 within the radio 28. The preferred embodiment of the synthesizer interface 56 enables programming of different types of synthesizers within the synthesizer component 58 through the utilization of a three wire interface. A synthesizer which may be utilized within the radio 28 includes a PLL-frequency synthesizer having a 3-wire bus provided by Siemens and having part designation TBB 206.

The host processor 46 controls the frequency utilized for transmission. The host processor 46 applies frequency control values within the radio control word to the radio signal controller 48. Responsive to the radio control word, the radio signal controller 48 subsequently applies radio control signals to the synthesizer interface 56. The synthesizer interface 56 outputs frequency control signals and power control signals to the synthesizer component 58. The control signal control the transmit and receive frequencies of the transmitter 52 and receiver 50. In a DECT application utilizing 10 carrier frequencies, 10 TX synthesizer values and 10 RX synthesizer values may be used.

The synthesizer component 58 within the DECT radio system may include an IF (intermediate frequency) synthesizer and RF (radio frequency) synthesizer. The IF and RF synthesizers may be selected with a 3-wire bus signal. The synthesizer interface 56 may provide 3 LE signals for different radio architectures. Normally, a 2LO synthesizer is used for the IF frequency and either one or two 1LO synthesizers may be utilized for the RF frequencies. Utilizing two 1LO synthesizers permits the first synthesizer to change or adjust its output frequency while the second synthesizer is utilized to control the frequency of transmission or reception of the RF signals. Once the current slot has been transmitted or received, the second synthesizer may be utilized to control the frequency of transmission or reception of the next DECT slot.

A transmit receive switch 37 is provided within the radio 28 to selectively connect one of the receiver 50 and transmitter 52 with an antenna 36, 49. The host processor 46 provides a control value within the radio control word applied to the radio signal controller 48. The radio signal controller 48 generates an appropriate radio control signal which operates the transmit receive switch 37 responsive to the radio control word.

With reference to the receiving mode of operation, the RF signals received via the antenna 36 are applied to the transmit receive switch 37 and directed to the receiver 50. A preferred receiver 50 includes a receive band-pass filter 60, amplifier 62, demodulator 64, and data slicer 66. The RF signals initially pass through the band-pass filter 60 and are amplified within amplifier 62. The output of the amplifier 62 is applied to a demodulator 64 which recovers the base band signal of the received RF signal. The synthesizer component 58 applies the appropriate frequency to the demodulator 64 to extract the base band signal.

The output of the demodulator 64 is applied to the data slicer 66 which performs analog to digital conversion operations. The data slicer 66 extracts the slice level during the preamble 13 and synchronization word 14 of the receive DECT slot. The data from the data slicer 66 is applied to the data recovery circuit 39 which operates to extract the recovered clock. The recovered clock and received data are applied to the physical layer processor 38.

Referring to the transmission mode of operation, the physical layer processor 38 applies the appropriately formatted DECT data signal to the transmitter 52 via line 45. The preferred embodiment of the transmitter includes a transmit data filter 68, modulator 70, transmit amplifier 72 and transmit band-pass filter 74.

The transmit data signal is first applied to the transmit data filter 68 which performs digital to analog conversion operations. The data signal is thereafter applied to the modulator 70 which generates the RF transmit signal. The modulator 70 receives the frequency signal from the synthesizer component 58. The modulator 70 preferably utilizes Gaussian Minimum Shift Keying (GMSK) modulation in compliance with the DECT standard. GMSK modulation provides a resultant waveform which exhibits phase continuity resulting results in reduced problems due to intersymbol interference.

Following modulation, the RF transmit signal is amplified within the transmit amplifier 72 and applied to transmit band-pass filter 74. The output of the transmitter 52 is applied to the transmit receive switch 37 which directs the RF transmit signal to the antenna 36.

Turning now to FIG. 7, the radio signal controller 48 is configured to control the operation of the radio 28. The radio signal controller 48 outputs a plurality of radio control signals for controlling various functions of the radio 28. The generation of the radio control signals is preferably programmable permitting the utilization of the radio signal controller 48 in accordance with the present invention with a variety of radios 28. In particular, it is preferable to program the timing of the activation and deactivation of various radio control signals.

For example, a first radio may require a given time period of x before reliable transmit operations may be performed thereby. In particular, the synthesizers of the radio must settle upon the appropriate carrier frequency and the transmit amplifier must be sufficiently powered before radio frequency communications may be performed. However, a second radio to be utilized within the communication device 20, 21 may require a given time period of 2x before reliable transmit operations may be performed. Therefore, providing programmable controlled assertion and de-assertion of the radio control signals permits use of the radio signal controller 48 with different types of radios.

In addition, providing programmability in accordance with present invention enables optimum radio operation. It is desirable to closely tailor the operational periods of the receiver 50 and transmitter 52 of the radio 28 to the protocol being utilized by the communication system 19 in order to reduce unnecessary power consumption by the radio 28.

Within a number of communication protocols, such as DECT, the radio 28 only operates for predefined periods of time, and is otherwise idle at all other times. The radio 28 operates to one of transmit or receive the S field, A field, B field and Z field during a DECT slot and is idle intermediate the slots. Therefore, it is desirable to power down the radio 28 during the predefined periods of inactivity to minimize power consumption.

As discussed above, different radios may require different set up time parameters which enable reliable transmission or reception of radio frequency signals. It is desirable to permit programmability to vary the timing of the assertion and de-assertion of the radio control signals to match the parameters of the specific radio being utilized to provide efficient operation of the communication device 20. A preferred embodiment of the radio signal controller 48 permits such programmability of the assertion and de-assertion of the radio control signals.

Referring to FIG. 7, the radio signal controller 48 in accordance with the present invention comprises a memory device 80, memory controller 83, and signal generator 92. A preferred embodiment of the memory controller 83 includes an address counter 82, slot decoder 84, comparator 86 and AND circuit 88. A preferred embodiment of the signal generator 92 comprises an output latch. The memory device 80 is preferably a RAM memory device which is operable to store the appropriate program radio control code which is utilized to control the corresponding radio 28. The radio control code may be downloaded from the ROM 34 to the memory device 80.

Referring to FIG. 8, one embodiment of the memory device 80 is shown in detail. The memory device 80 includes a plurality of memory sections 81a–81e. In particular, the memory device 80 includes a default memory section 81a and four radio control memory sections 81b–81e. The radio control memory sections 81b–81e each include a plurality of memory locations which are each configured to store a sequence word having at least one radio signal level value therein. The embodiment of the memory device 80 shown in FIG. 8 includes memory sections 81b–81e which are each configured to store 12 sequence words of 24 bits. The radio control memory sections 81b–81e are configured to store transmit sequence words, receive sequence words, idle transmit sequence words and idle receive sequence words, respectively.

The radio control code stored within the ROM 34 comprises the sequence words which are loaded into the memory device 80. Each sequence word includes a time field 65, radio signal level (RSL) field 69 and end field 67. The time field 65 includes bits 0–6, the RSL field 69 includes bits 8–16 and the end field 67 is bit 7. The number of bits within the time field 65 may be varied according to slot size to permit the assertion or de-assertion of radio control signals at any bit number of the slot.

The RSL field 69 of the sequence word includes at least one radio signal level value which corresponds to a respective bit therein. The time field 65 includes a timing identifier which is utilized for sequential addressing operations discussed in detail below. The end field bit may be utilized to indicate the last sequence word within the respective memory section 81a–81e. The default memory section 81a is operable to store a plurality of default radio signal level (RSL) values. The default RSL values are read into the signal generator 28 prior to any transmit or receive slot. The signal generator 28 generates a plurality of default radio control signals which correspond to the default RSL values. Outputting default radio control signals verifies the configuration of the radio control signals and prevents outputting of spurious control signals to the radio 28. A subsequent DECT transmit or receive slot may be processed by the radio signal controller 48 following the default mode of operation.

Referring again to FIG. 7, the RSL values within the sequence words control the generation of radio control signals by the signal generator 92. The radio control signals are utilized to operate appropriate components within the radio 28. As indicated above, the timing of the assertion and de-assertion of the radio control signals by the radio signal controller 48 is also of primary importance for permitting design flexibility and use with radios having different operational parameters.

Figure 9:
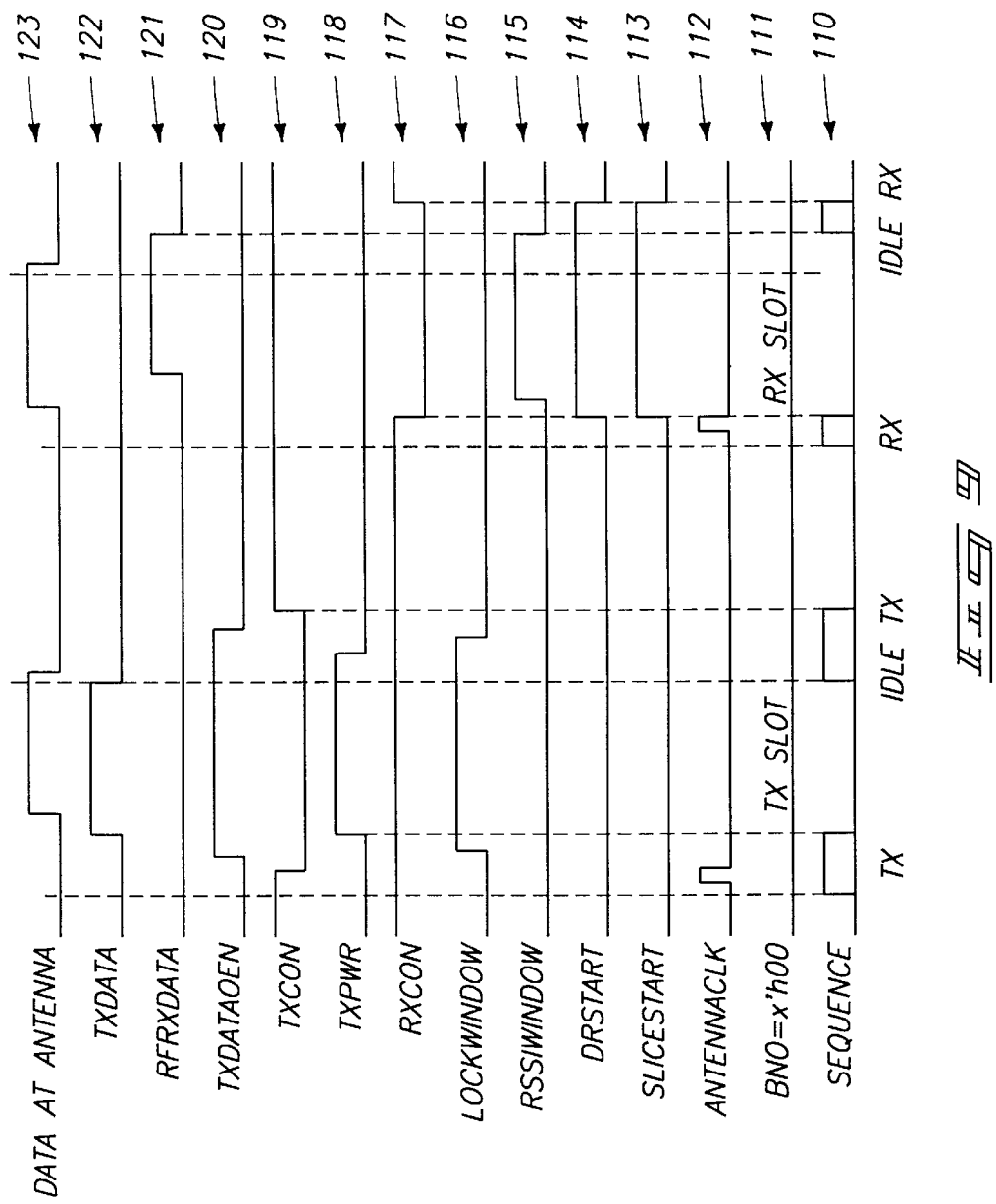
FIG. 9 is a radio control timing diagram for the handset radio communication device.

Referring to FIG. 9, the timing of the assertion and de-assertion of various radio control signals which provides optimum performance with one specific radio is shown. Such timing of the assertion and de-assertion of the radio control signals is vital for optimum performance.

The timing of such assertion and de-assertion of the radio control signals is dependent upon the type of DECT slot. The type of routine (transmit, idle transmit, receive, idle receive) executed from the memory device 80 is indicated by SEQUENCE, represented by line 110. The slot decoder 84 is operable to detect the type of the current DECT slot.

Following the detection of a transmit slot by the slot decoder 84, the RSL values within the sequence words stored within memory section 81b are accessed by the radio signal controller 48 to control the assertion and de-assertion of transmit radio control signals. The radio signal controller 48 first asserts the ANTENNACLK signal, represented by line 112, which is utilized to clock the antenna level control value within the radio control word into the signal generator 92. The signal generator 92 creates a radio control signal which is output to the radio 28 and controls the selection of the antenna diversity 49 responsive to the RSSI signal.

Next, a TXCON radio control signal, represented by line 119, is asserted (logic low) to enable various transmitter 52 components such as the modulator 70. Thereafter, the TXDATAOEN radio control signal, represented by line 120, is asserted to control the buffered TXDATA output of the burst mode controller 26. The LOCKWINDOW radio control signal, represented by line 116, is next asserted to provide synthesizer lock monitor function. Next, the TXPWR radio control signal, represented by line 118, is asserted to enable the amplifier 72 within the transmitter 52. The physical layer processor 38 next provides the data to be transmitted (TXDATA), represented by line 122, to the radio 28. The TXDATA data is subsequently received at the appropriate antenna 36, 49 represented by line 123, for transmission.

During an idle transmit routine (again indicated on the SEQUENCE line), the radio control signals are sequentially de-asserted at specified times in accordance with the RSL values of the sequence words stored within memory section 81d. For example, the TXPWR signal is first de-asserted, followed by the de-assertion of the TXDATAOEN and LOCKWINDOW radio control signals. The appropriate radio control signals are sequentially asserted and de-asserted in accordance with the radio signal level values stored within the memory device 80.

In addition to the radio control signals previously discussed with respect to the transmit mode of operation, the radio signal controller 48 is configured to output additional radio control signals to control the operation of the receiver 50. The RSL values of the sequence words stored within memory sections 81c, 81e are utilized to control the assertion, de-assertion, and polarity of the radio control signals applied to the receiver 50.

In particular, the radio signal controller 48 outputs a SLICESTART signal, represented by line 113. The assertion of the SLICESTART signal indicates the DECT bit time when the control value within the radio control word from the host processor 46 is activated to generate a SLICECNTRL radio control signal. The SLICECNTRL radio control signal selects two different time constants within the data slicer 66 and is normally enabled during the first receiver preamble bit.

The RXCQN radio control signal, represented by line 117, enables various receiver components such as the demodulator 64. The assertion of the RSSIWINDOW radio control signal, represented by line 115, starts the period wherein RSSI measurements are made within the RSSI circuit 54. The RSSI measurements are made while the RSSIWINDOW control signal is asserted.

The DRSTART radio control signal, represented by line 114, indicates the DECT bit time where a DRCNTL radio control signal is activated which enables the data recovery circuit 39 to extract the receive clock from the receive data signal. The DRCNTL signal is normally enabled before the start of the first receive preamble bit. The physical layer processor 38 deactivates the DRCNTL signal once the synchronization word has been found.

The respective receive radio control signals may be de-asserted in accordance with the RSL values of the sequence words stored within the fourth radio control memory section 81e during the IDLE RX sequence indicated by line 110.

Referring again to FIG. 7, the signal generator 92 is operable to output radio control signals responsive to input (radio signal level values and control values) from the memory device 80 and host processor 46. The preferred embodiment of the signal generator 92 comprises a first RSO (radio signal output) latch 94 and second RSO latch 96. The radio signal controller 48 includes AND circuit 88 operable to control the input of radio signal level (RSL) values from the appropriate sequence word and control values from the radio control word into the respective first RSO latch 94 and second RSO latch 96. The radio signal controller 48 is configured to clock the control values provided within the radio control word into the second RSO latch 96 responsive to the radio signal level values of the sequence words stored within the memory device 80. Further operation of the radio signal controller 48 and generation of radio control signals is described immediately below in detail.

Responsive to addressing by the address counter 82 and slot decoder 84, the RSL values within the RSL field 69 of a selected sequence word are applied to the first RSO latch 94. The RSL values of the selected sequence word are thereafter selectively latched into the first RSO latch 94. The first RSO latch 94 within the signal generator 92 outputs radio control signals which correspond to the received RSL values.

The control values within the radio control word may be clocked into the second RSO latch 96 responsive to the RSL values of the selected sequence word. The second RSO latch 96 within the signal generator 92 outputs radio control signals which correspond to the inputted control values within the radio control word. The RSL field 69 of the selected sequence word controls the timing, in accordance with the bit number, of the application of the control values of the radio control word into the second RSO latch 96. In particular, the output of the first RSO latch 94 is applied via line 90 to the second RSO latch 96. The output of the first RSO latch 94 clocks the control values into the second RSO latch 96.

As emphasized above, the timing of the assertion and de-assertion of the radio control signals is vital to achieve optimal performance of the communication devices 20, 21. The memory device 80 operates as a sequence RAM wherein selected ones of the memory locations therein are sequentially addressed to provide flexibility in controlling the specific timing of the assertion and de-assertion radio control signals. The comparator 86 and address counter 82 of the radio signal controller 48 are configured to sequentially address the memory locations within the memory device 80 and provide sequence RAM operation.

The radio signal controller 48 according to the present invention is configured to provide, if necessary, control of each radio control signal at each bit number within a DECT slot. The addressing of the memory device 80 is dependent upon the bit number. The time field 65 of the addressed sequence word specifies the exact bit within the DECT slot at which the RSL values of the selected sequence word and the control values of the radio control word are read into the signal generator 92. RSL values and control values are latched into the signal generator 92 in response to the time field 65 of the selected sequence word matching the bit number.

The host processor 46 configures the physical layer processor 38 to know the type of the upcoming slot (Transmit (Tx), Receive (Rx), and Idle) in the DECT protocol. In particular, the host processor 46 applies slot identification signals to the physical layer processor 38. The physical layer processor 38 is operable to output slot identification signals via bus 43 to the slot decoder 84 which identify the type of upcoming slot. The slot decoder 84 interprets the slot identification signals and applies signals corresponding to the type of slot to the address counter 82. The address counter 82 reads the output of the slot decoder 84 and addresses (selects) one of the memory sections 81b–81e within the memory device 80 responsive to the identification signals.

Addressing within the selected radio control memory section 81b–81e is dependent upon the bit number provided by the physical layer processor 38. More specifically, the physical layer processor 38 applies the bit number via input bus 41 to the comparator 86. The comparator 86 is also coupled with the memory device 80. In particular, the comparator 86 receives the time field 65 (bits 0–6) of the selected sequence word within the selected memory section 81b–81e. The comparator 86 outputs a match control signal to AND circuit 88 responsive to the time field 65 of the selected sequence word matching the bit number.

The AND circuit 88 is operable to output an increment control signal responsive to the timing signal and a clock signal provided directly from the physical layer processor 38 via line 95. The increment control signal is applied via line 89 to the address counter 82 and the first RSO latch 94. Responsive to receiving the increment control signal from the AND circuit 88, the address counter 82 increments the address control signals applied to the memory device 80. Preferably, the next memory location within the selected memory section 81b–81e is addressed. The first RSO latch 94 is configured to read in the RSL values of the sequence word within the previously addressed memory location responsive to receiving the control signal from the AND circuit 88. Thereafter, the signal generator 92 outputs radio control signals which correspond to the RSL values to the radio 28.

The end field bit (bit 7 of the sequence word) informs the address counter 82 when the last memory location (i.e., last sequence word) within the selected memory section 81b–81e has been addressed. Subsequent to receiving indication from the end field bit, the address counter 82 is operable to stop incrementing until a new processing of a new section is required. The default RSL values within the default memory section 81a are read into the first RSO latch 94 and default radio control signals which correspond thereto are applied to the radio 28. Section 81a of memory device 80 is used on reset to initialize the default levels of the RSO latches 94, 96.

From the foregoing it can be seen that the application of the radio signal level values and control values to the signal generator 92, and the subsequent generation of radio control signals thereby, are dependent upon the bit number supplied by the physical layer processor 38. More specifically, the time field 65 (bits 0–6) of the currently addressed sequence word dictates the time (i.e. bit number) at which the RSL values within the current sequence word will be applied to the first RSO latch 94.

Once the bit number matches (i.e., is equal to) the time field 65 of the currently selected sequence word, the RSL values within the RSL field 69 of the current sequence word are read into the signal generator 92 for controlling the generation of radio control signals, and the address counter 82 is incremented and addresses the sequence word within the next memory location of the selected memory section 81b–81e, The address counter 82 sequentially addresses each of the memory locations within the selected memory section 81b–81e until the end field bit is read. The end field bit indicates the end of the Tx sequence, Rx sequence, Tx Idle sequence or Rx Idle sequence.

The time field 65 of the current sequence is programmed such that the address counter 82 increments the address control signals applied to the memory device 80 once the time field 65 matches the bit number. The radio control signals may be asserted and de-asserted at any bit number of the DECT slot specified by the programmed time field 65 of the sequence word. In other words, the radio signal controller 48 can switch the radio control signals anywhere within the DECT slot. Therefore, the program radio control code is written such that the timing (bit number) of the application of the RSL values within the current sequence word are controlled by the time field 65 of the current sequence word.

As indicated above, the RSL values of the sequence words stored within the memory device 80 also control the inputting of the control values of the radio control word into the signal generator 92 at the start of a DECT slot. The output of the first RSO latch 94 is applied to the second RSO latch 96. The radio control word is received within the second RSO latch 96 responsive to the RSL values being a preselected value and the bit number matching the current time field 65. Thus, the sequence RAM memory device 80 also controls the timing of the generation of radio control signals responsive to the control values provided within the radio control word.

Figure 10:
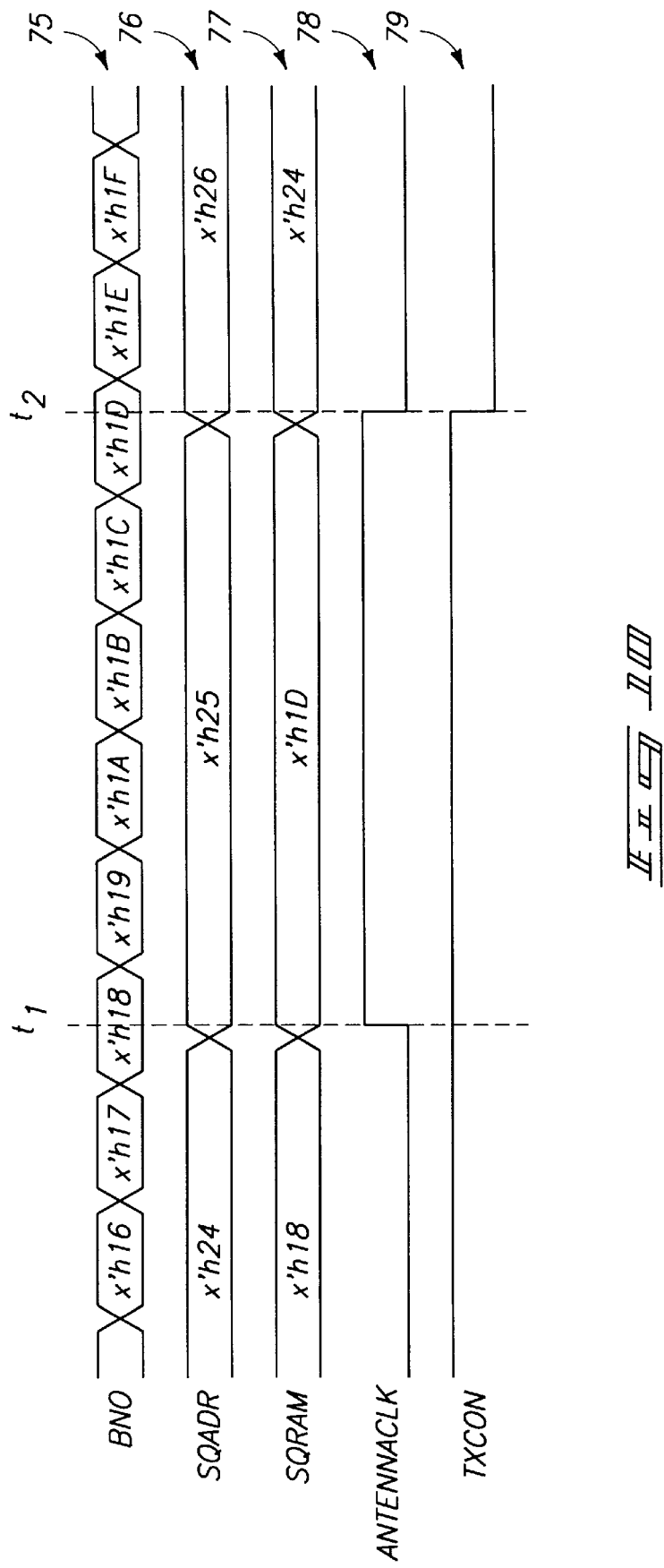
FIG. 10 is a transmit sequence signal diagram.

Referring to FIG. 10, a transmit sequence signal diagram is shown. The bit number (BNO), represented by line 75 (corresponding to line 111 in FIG. 9), is shown being sequentially incremented from hexadecimal 16 to hexadecimal 1F across the timing diagram. The address control signals (SQADR) output from the address counter 82, represented by line 76, address or select the memory location corresponding to hexadecimal 24 prior to time $t_1$. The time field (SQRAM), represented by line 77, within the currently selected (i.e., time $<t_1$) sequence word (stored within the hexadecimal 24 memory location of the memory device 80) is equal to hexadecimal 18.

The address control signals SQADR are incremented at time t₁ responsive to the bit number (BNO) matching the time field (SQRAM) of the current sequence word. Accordingly, the address counter 82 addresses the next sequence word stored in the memory location corresponding to hexadecimal 25. The sequence word stored within the memory location corresponding to hexadecimal 24 includes a RSL value which asserts the ANTENNACLK radio control signal, as represented at line 78, at time t₁.

The time field (SQRAM) within the new sequence word (addressed when time >t₁ and <t₂) is hexadecimal 1D. At t₂, the address control signals (SQADR) are incremented again in response to the bit number (hexadecimal 1D) matching the selected time field (hexadecimal 1D). The sequence word stored with the memory location corresponding to hexadecimal 25 includes RSL values which de-assert the ANTENNACLK and TXCON radio control signals as represented at lines 78, 79, respectively.

The time field (SQRAM) within each sequence word is programmed in the radio control code to increment the address counter 82 at a predetermined time within the DECT slot when it is necessary to either assert or de-assert at least one radio control signal to optimize the performance and operation of the radio 28 and communication device 20, 21. The RSL value(s) from the last addressed sequence word is/are valid until the start of the following idle sequence.

Referring to FIG. 11, an idle transmit sequence signal diagram is shown. An idle receive or idle transmit sequence starts when the end of the data packet has been reached, represented by line 100. In particular, the physical layer processor 38 asserts an ENDING_SLOT signal, represented by line 101, at t₁. The asserted ENDING_SLOT signal is applied to the slot decoder 84 via bus 43 at the end of the data packet of the current DECT slot.

Once the physical layer processor 38 asserts the ENDING_SLOT signal, the address control signals (SQADR) provided by the address counter 82 are incremented responsive to a comparison of the time field 65 of the current sequence word with an internal counter (BCNTR), represented by line 102. The reference bit number counter (BNO) can't be used inasmuch as the idle sequence may start in the middle of a slot (e.g. for an A-field only DECT slot). The idle counter BCNTR starts counting from hexadecimal 00 when the last data packet bit has been clocked by the physical layer processor 38.

Similar to the discussion above regarding the transmit sequence, the address control signals (SQADR), represented by line 103, are incremented at t₁ responsive to the slot decoder 84 decoding the start of a new sequence routine following the ENDING_SLOT signal, represented by line 101. The address control signals (SQADR) are additionally incremented at times t₂ and t₃ responsive to the time field (SQRAM), represented by line 104, of the selected sequence word matching the internal counter (BCNTR). The idle transmit sequence shown in FIG. 11 is configured to de-assert the TXPWR radio control signal, represented by line 106, at time t₂ (BCNTR=hexadecimal 03) and the TXDATAOEN radio control signal, represented by line 105, at time t₃ (BCNTR=hexadecimal 06)

The number of memory locations within each of the memory sections 81b–81e dictates the number of radio control events which may be implemented during a given slot. If twelve memory locations are provided within a particular memory section 81b–81e, selected radio control signals may be either asserted or de-asserted at twelve different bit numbers within the slot. The status (asserted or de-asserted) of more than one radio control signal may be changed responsive to the RSL values of one sequence word. In other words, a plurality of RSL values within the current selected sequence word may be different than the RSL values within the previously selected sequence word.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A radio signal controller configured to control a radio to communicate a plurality of slots comprising:
    a memory device having a plurality of memory locations individually configured to store at least one radio signal level value;
    a memory controller operable to address the memory locations according to timing of the slots; and
    a signal generator operable to receive at least one radio signal level value and output a radio control signal responsive thereto.

2. The radio signal controller according to claim 1 wherein the memory device includes a plurality of memory sections which individually include some of the memory locations.

3. The radio signal controller according to claim 2 wherein the memory controller includes a slot decoder operable to select at least one of the memory sections.

4. The radio signal controller according to claim 1 wherein the memory controller includes an address counter operable to sequentially address the memory locations.

5. The radio signal controller according to claim 1 wherein the memory controller sequentially addresses the memory locations responsive to a timing signal.

6. The radio signal controller according to claim 5 wherein the timing signal is a bit number of a DECT slot.

7. The radio signal controller according to claim 1 wherein the memory locations individually store a sequence word having at least one radio signal level value and a time field.

8. The radio signal controller according to claim 7 wherein the memory controller sequentially addresses the memory device responsive to the time field matching a timing signal.

9. The radio signal controller according to claim 1 wherein the memory device is programmable.

10. The radio signal controller according to claim 1 wherein the memory controller comprises a slot decoder, address counter, and comparator.

11. The radio signal controller according to claim 1 wherein the signal generator is operable to output at least one radio control signal responsive to a control value.

12. The radio signal controller according to claim 1 wherein the radio signal controller is a DECT radio signal controller.

13. A radio signal controller comprising:
    an input bus operable to receive a timing signal comprising a bit number of a slot;
    a memory device configured to store at least one radio signal level value;
    a memory controller operable to address the memory device responsive to the timing signal; and a signal generator operable to receive the at least one radio signal level value and output a radio control signal responsive thereto.

14. The radio signal controller according to claim 13 wherein the memory device includes a plurality of memory sections which individually include a plurality of memory locations.

15. The radio signal controller according to claim 14 further wherein the memory controller includes a slot decoder operable to select at least one of the memory sections.

16. The radio signal controller according to claim 13 wherein the memory controller includes an address counter operable to sequentially address the memory device.

17. The radio signal controller according to claim 13 wherein the timing signal is a bit number of a DECT slot.

18. The radio signal controller according to claim 13 wherein the memory device stores a plurality of sequence words, and the sequence words individually have at least one radio signal level value and a time field.

19. The radio signal controller according to claim 18 wherein the memory controller sequentially addresses the memory device responsive to the time field matching the timing signal.

20. The radio signal controller according to claim 13 wherein the memory device is programmable.

21. The radio signal controller according to claim 13 wherein the memory controller comprises a slot decoder, address counter, and comparator.

22. The radio signal controller according to claim 13 wherein the signal generator is operable to output at least one radio control signal responsive to a control value.

23. A radio signal controller comprising:
an input bus operable to receive a timing signal comprising a bit number of a slot;
a memory controller operable to generate at least one address control signal responsive to the timing signal; and
a memory device configured to store at least one radio signal level value and output the at least one radio signal level value responsive to the at least one address control signal.

24. The radio signal controller according to claim 23 wherein the memory device includes a plurality of memory locations.

25. The radio signal controller according to claim 24 wherein the memory controller is operable to sequentially address the memory locations.

26. The radio signal controller according to claim 23 wherein the timing signal is a bit number of a DECT slot.

27. The radio signal controller according to claim 24 wherein the memory locations individually store a sequence word having at least one radio signal level value and a time field.

28. The radio signal controller according to claim 27 wherein the memory device outputs at least one radio signal level value responsive to the time field matching the timing signal.

29. The radio signal controller according to claim 23 wherein the memory device is programmable.

30. The radio signal controller according to claim 23 further comprising a signal generator operable to output a radio control signal responsive to the at least one radio signal level value.

31. The radio signal controller according to claim 30 wherein the signal generator is operable to output at least one radio control signal responsive to a control value.

32. In a radio communication device which includes a data processor operable to process a data signal comprising at least one slot and generate a timing signal, a radio operable to at least one of transmit and receive the data signal, and a radio signal controller operable to control selected operations of the radio, the radio signal controller comprises:
a memory device configured to store at least one radio signal level value;
a memory controller configured to address the memory device responsive to the timing signal comprising a bit number of a slot; and
a signal generator configured to receive at least one radio signal level value and output a radio control signal responsive thereto.

33. The radio signal controller according to claim 32 wherein the memory device includes a purality of memory sections which individually include a plurality of memory locations individually configured to store a sequence word.

34. The radio signal controller according to claim 32 wherein the memory controller sequentially addresses the memory device.

35. The radio signal controller according to claim 33 wherein the memory controller includes:
a slot decoder operable to select at least one of the memory sections responsive to a slot identification signal received therein from the data processor; and
an address counter operable to sequentially address the memory locations within the selected memory section responsive to the timing signal matching a time field within at least one sequence word.

36. The radio signal controller according to claim 32 wherein the timing signal is a bit number of a DECT slot.

37. The radio signal controller according to claim 32 wherein the memory device is programmable.

38. The radio signal controller according to claim 32 wherein the memory controller comprises a slot decoder, address counter, and comparator.

39. In a radio communication system including a plurality of communication devices individually operable to at least one of transmit and receive a data signal comprising at least one slot, the communication devices individually comprise:
a data processor operable to process the data signal and generate a timing signal comprising a bit number of a slot;
a radio configured to at least one of transmit and receive radio frequency signals; and
a radio signal controller including a memory controller operable to generate sequential address control signals responsive to the timing signal, and a memory device having a plurality of memory locations individually configured to store at least one radio signal level value and being configured to output at least one radio signal level value responsive to the address control signals.

40. The communication devices according to claim 39 wherein the timing signal is a bit number of a DECT slot.

41. The communication devices according to claim 39 wherein the memory locations individually store a sequence word having at least one radio signal level value and a time field.

42. The communication devices according to claim 41 wherein the memory device outputs at least one radio signal level value responsive to the time field matching the timing signal.

43. The communication devices according to claim 39 wherein the memory device is programmable.

44. The communication devices according to claim 39 individually further comprising a signal generator operable to output a radio control signal to the radio responsive to the at least one radio signal level value.

45. The communication devices according to claim 44 wherein the signal generator is operable to output at least one radio control signal responsive to a control value.

46. A DECT radio signal controller comprising:

an input bus configured to receive a bit number of a DECT slot;

a memory device having a plurality of memory sections which individually include a plurality of memory locations, the memory locations being individually configured to store at least one radio signal level value and a time field;

a slot decoder operable to select one of the memory sections;

an address counter operable to sequentially address the memory locations within the selected memory section;

a comparator operable to compare the bit number with the time field and increment the address of the address counter responsive to the time field matching the bit number; and an output latch operable to output a radio control signal responsive to the at least one radio signal level value.

47. A DECT radio communication device comprising:

a physical layer processor operable to generate at least one slot identification signal, process a data signal, generate a bit number and output at least one control value;

a radio configured to at least one of transmit and receive radio frequency signals;

a radio signal controller operable to control selected operations of the radio, the radio signal controller including a programmable memory device, slot decoder, comparator and address counter;

the memory device having a plurality of memory sections which individually include a plurality of memory locations, the memory locations individually configured to store a sequence word having at least one radio signal level value and a time field;

the slot decoder being operable to select one of the memory sections responsive to the at least one slot identification signal;

the comparator being operable to receive the time field from an addressed memory location and compare the bit number thereto, and output an increment signal responsive to the time field matching the bit number;

the address counter being operable to generate at least one address control signal to sequentially address the memory locations within the selected memory section, and increment the at least one address control signal responsive to the increment signal; and an output latch operable to output a radio control signal to the radio responsive to one of the at least one radio signal level value and control value.

48. A method of controlling a radio, comprising:

providing a memory device;

storing a radio signal level value within the memory device;

generating a timing signal comprising a bit number of a slot;

reading the radio signal level value responsive to the timing signal; and applying a radio control signal to the radio responsive to reading the radio signal level value.

49. The method according to claim 48 further comprising the step of storing a time field within the memory device.

50. The method according to claim 49 further comprising the step of comparing the time field with the timing signal.

51. The method according to claim 48 further comprising the step of storing a plurality of sequence words individually having at least one radio signal level value and a time field.

52. The method according to claim 48 further comprising the steps of:

matching the timing signal with a time field; and incrementing at least one address control signal responsive to the matching.

53. The method according to claim 48 wherein the reading includes sequentially reading a plurality of memory locations within the memory device.

54. The method according to claim 48 wherein the timing signal is a DECT bit number.

55. The method according to claim 48 further comprising the steps of:

generating a control value; and applying a radio control signal to the radio responsive to the control value.

56. The method according to claim 48 further comprising the step of addressing at least one memory section within the memory device.

57. A method of controlling a radio configured to communicate a plurality of slots comprising:

providing a memory device having a plurality of memory locations;

storing at least one radio signal level value within individual ones of the memory locations;

addressing the memory locations according to timing of the slots;

reading at least one radio signal level value; and applying a radio control signal to the radio.

58. The method according to claim 57 further comprising the step of generating a radio control signal responsive to reading the at least one radio signal level value.

59. The method according to claim 57 wherein the addressing is responsive to receiving a DECT bit number.

60. The method according to claim 57 further comprising the steps of:

generating a control value; and applying a radio control signal to the radio responsive to the control value.

61. The method according to claim 57 further comprising the step of addressing at least one memory section within the memory device.

62. The method according to claim 57 further comprising the steps of:

generating a timing signal;

storing a time field within individual ones of the memory locations; and comparing the time field with the timing signal.

63. The method according to claim 57 further comprising the steps of:

generating a timing signal;

storing a time field within individual ones of the memory locations;

matching the timing signal with the time field; and incrementing at least one address control signal responsive to the matching.

* * * * *

UNITED STATES PATENT AND TRADEMARK OFFICE
CERTIFICATE OF CORRECTION

PATENT NO : 6,073,009
DATED : June 6, 2000
INVENTOR(S) : Roland van der Tuijn et al.

It is certified that error appears in the above-identified patent and that said Letters Patent are hereby corrected as shown below:

Col. 2, line 53
  delete "is".

Col. 4, line 51
  delete "so".

Col. 8, line 1
  replace "a nd"
  with --and--.

Col. 8, line 2
  replace "i s"
  with --is--.

Col. 12, line 10
  replace "RXCQN"
  with --RXCON--.

Signed and Sealed this

Twenty-second Day of May, 2001

*Attest:*

NICHOLAS P. GODICI

*Attesting Officer*      *Acting Director of the United States Patent and Trademark Office*